US008665097B2

(12) United States Patent  
Worthington et al.

(10) Patent No.: US 8,665,097 B2  
(45) Date of Patent: *Mar. 4, 2014

(54) SYSTEM AND METHOD OF WORKER FALL DETECTION AND REMOTE ALARM NOTIFICATION

(75) Inventors: Stephen David Worthington, Calgary (CA); Sean Everett Stinson, Calgary (CA)

(73) Assignee: Honeywell International Inc., Morristown, NJ (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/104,533

(22) Filed: May 10, 2011

(65) Prior Publication Data

US 2012/0286949 A1 Nov. 15, 2012

(51) Int. Cl.
*G08B 23/00* (2006.01)

(52) U.S. Cl.
USPC .................. 340/573.1; 340/539.1; 340/573.7

(58) Field of Classification Search
USPC ............................................ 340/539.1, 573.1
See application file for complete search history.

(56) References Cited

U.S. PATENT DOCUMENTS

2004/0021569 A1* 2/2004 Lepkofker et al. .......... 340/568.1  
2006/0270949 A1* 11/2006 Mathie et al. ................. 600/595  
2010/0231402 A1* 9/2010 Flynt et al. .................... 340/679

OTHER PUBLICATIONS http://mobihealthnews.com/5923/, Wellcore unveils fall detection, activity monitor, Brian Dolan, Jan. 6, 2010, pp. 1-7.  
http://mobihealthnews.com/5926/, Wellcore Announces Automatic Fall Detection and Wellness Monitoring System, Brian Dolan, Jan. 6, 2010, pp. 1-6.

* cited by examiner

*Primary Examiner* — Kerri McNally  
(74) *Attorney, Agent, or Firm* — Husch Blackwell LLP

(57) ABSTRACT

A fall indicating alarm system includes one or more fall sensors and at least one gas sensor coupled to a displaced alarm system which, responsive to an output from a fall sensor, generates an audible or visual alarm indicator. Both local and displaced alarm indicators can be generated.

18 Claims, 3 Drawing Sheets

SYSTEM AND METHOD OF WORKER FALL DETECTION AND REMOTE ALARM NOTIFICATION

FIELD

The application pertains to systems and methods of detecting workplace injuries and sounding an alarm indicative thereof. More particularly, the application pertains to such systems and methods that might be useful in large industrial, or commercial work sites.

BACKGROUND

Refineries and other industrial facilities often have large pieces of equipment and workers are required to work at heights above the ground. Although fall protection and safety systems and protocols are employed, falls still represent a significant hazard and are a common source of worker injury. The ability to quickly detect that an injury has occurred or has potentially occurred means that a rescue response can be initiated quickly. In the case of an isolated employee working alone, a fall may incapacitate the employee rendering them injured and unable to call for assistance or a rescue.

DETAILED DESCRIPTION

Figure 1:
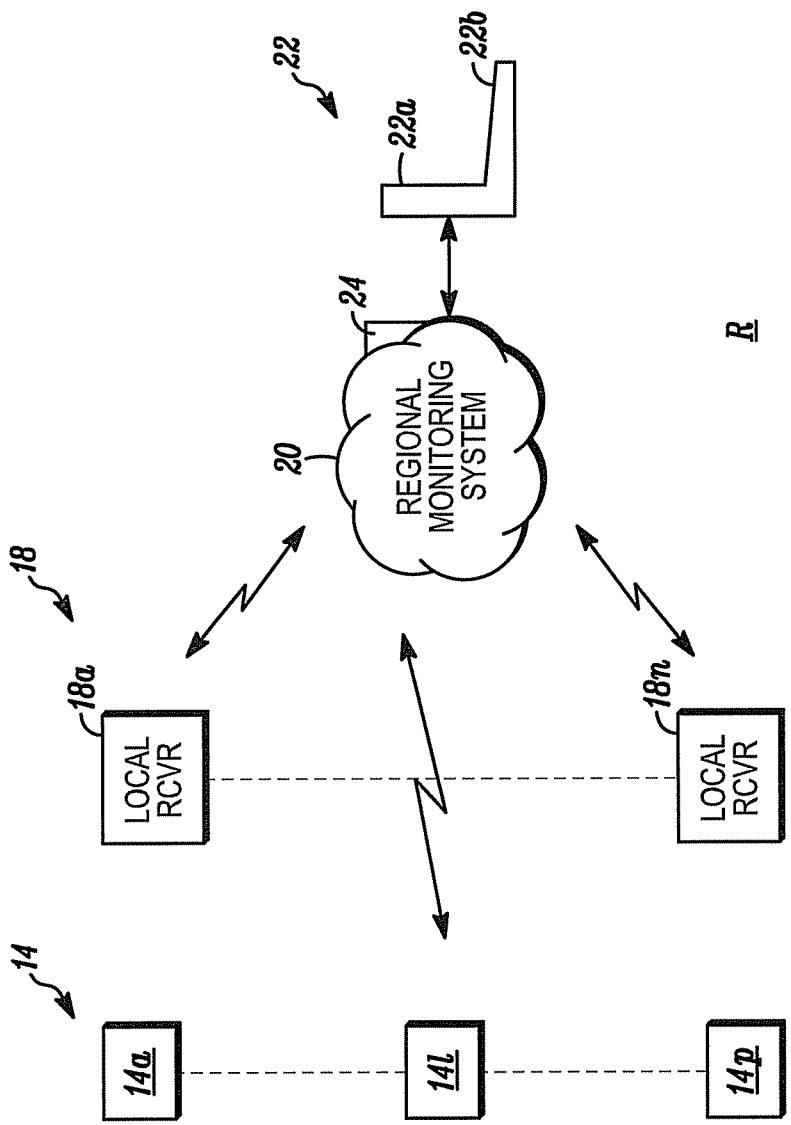
FIG. 1 is a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

A system in accordance herewith can detect if a worker has fallen. In response, a local alarm can be generated as well as remote notification given that a fall has occurred.

Such systems can incorporate fall detectors in respective devices that workers already carry and that already include local alarm annunciation and remote notification functions. One example is a wireless gas detector which includes a fall sensor. Other examples include radiation detectors with included fall sensors, fluid detectors with included fall sensors, wireless communications devices such as cell phones, wireless notebooks or PDAs with fall sensors incorporated therein or attached thereto as external modules.

In one aspect, a plurality of wireless, fall sensing gas detectors can be in communication with a regional monitoring system, directly or via local receivers coupled to the system. The monitoring system can, in response to a fall indicating signal received from a member of the plurality, sound an alarm at an operator station. Local alarms in various of the detectors can also be activated in response to fall indicating signals.

Various functions can be carried out by a system in accordance herewith. First, a fall has to occur and be sensed. Second, a local alarm can be generated to alert nearby workers that a fall has occurred. Third, notification that a fall has occurred can be sent to a remote station alerting others that a fall has occurred and an investigation or rescue is required.

The first task, fall detection, can be accomplished using portable, body-worn apparatus that it capable of detecting the sudden acceleration and deceleration associated with fall and impact events. It will be understood that other types of fall sensors, such as position indicating sensors, could also be used.

A small, body-worn, battery powered device equipped with a programmed microprocessor and an electronic accelerometer can accomplish this task. Examples of these devices include portable gas detectors equipped with microprocessors and accelerometers, or position sensors. As noted above, other types of detectors include wireless radiation detectors, or fluid detectors, cell phones, PDAs and the like, all of which would include a fall sensor.

The microprocessor executes a preloaded control program that monitors the output of the accelerometer, or other fall sensor. By way of example, and not limitation, the control program compares the output from the accelerometer with the acceleration events associated with a fall and subsequent impact. This can be done as follows: when a worker is standing or moving normally, the accelerometer detects relatively low acceleration events that are of short duration.

On the other hand, when a fall is initiated, the device begins accelerating downward due to gravity. This occurs at a rate of approximately 9.81 m/s^2. In a fall, this acceleration will occur until impact or until terminal velocity is achieved. In either case, the acceleration event will be of relatively large magnitude and duration compared to normal movement. This large acceleration of 9.81 m/s^2 is the first indication that a fall is underway.

The control program being executed by the microprocessor in the respective detector can be configured to detect this acceleration pattern from the accelerometer. The fall will end with an impact or a very abrupt deceleration. Again, the output from the accelerometer will indicate a very large and brief acceleration. The control program can also be configured to recognize this large, sudden acceleration signal. The control program can be configured to recognize either or both of a relatively sustained acceleration at 9.81 m/s^2 or a very large acceleration signal as indicating a fall has occurred.

The detected fall can be communicated by the battery-powered device with the microprocessor and accelerometer running the control program as described above. Either or both of local or displaced alarms can be activated as described below.

The second task, generating a local alarm, can be accomplished by the same body-worn, battery powered device which is equipped with an annunciator. The device does not need to be a gas detector which is exemplary only as such detectors are commonly worn by industrial workers. Other commonly worn industrial equipment comes within the spirit and scope hereof.

The local alarm function can be implemented as follows: when the control program described above detects that a fall has occurred it enables another module that activates the local alarm annunciators. The local alarm annunciators can take the same form as those found on portable gas detectors and can include flashing LED's, buzzers or other audible indicators and vibrators. The way in which these annunciators are constructed and activated are known to those skilled in the art and need not be described in detail.

The third task, notifying a remote entity that a fall has occurred, can be accomplished using the portable, wireless, body-worn, battery-powered device equipped with a radio link, as described above, to a remote monitoring station, or other monitoring system as appropriate. When the control program running on the microprocessor has detected that a fall has occurred it will enable or activate a communications module that, via the radio link, sends a message indicating that a fall has occurred to a remote monitoring station.

The radio link can, for example, be implemented via a WiFi connection, a cellular-type connection, or, a dedicated wireless protocol as used in wireless alarm systems. The manner in which this link is established and communication occurs is known and need not be discussed further.

A bi-directional communication link can be provided enabling the remote monitoring station to send a selected message to the device, for example to determine the status of the person wearing the device, or apparatus. This message may be a text message, a voice message or another form of digital signal sent through the wireless connection.

A mechanism can be provided by which the apparatus determines the severity of the situation by automatically challenging the wearer of the apparatus to respond after it detects a fall or landing. The challenge could be to press a button or to shake the device (or other means) to notify the system that the wearer is still conscious. If the wearer does not respond to the challenge, the apparatus triggers the remote alarm.

A mechanism can be provided by which the system increases it's detection of a serious fall event by temporarily changing it's motion detection parameters after it detects an acceleration beyond a certain threshold. During the period of altered motion alarm parameters after a possible fall, the device and/or the monitoring system will alarm if no motion is detected for a pre-determined time period.

A mechanism can be provided by which the apparatus and remote monitoring station system improve the selectivity of fall events over time by adjusting the fall and landing thresholds and algorithms automatically, or, based on input from an operator through a feedback mechanism in the remote monitoring system. The feedback mechanism would provide information to the remote monitoring system as to which of the reported falls were false alarms and which were severe events. The remote monitoring system would then calculate new thresholds and/or algorithms and update the plurality of detectors, or, instruments with the improved thresholds and/or algorithms.

FIG. 1 illustrates an exemplary system 10 in accordance herewith. System 10 includes an exemplary plurality 14 of environmental detectors, 14a, 14b . . . 14p such as gas detectors, radiation detectors and the like, all without limitation. Each of the detectors, such as 14l includes a fall sensor such as, an accelerometer, or a position sensor. Each of the detectors of the plurality 14 is a portable, wearable, wireless device which can communicate directly, or indirectly via a member 18n of a plurality 18 of local receivers that might be installed throughout a region R.

A regional monitoring system 20 can receive fall indicating, or other types of communications, directly from the units 14l or indirectly via the local receivers 18n, which might be in wired or wireless communication with, the system 20. System 20 could correspond to a fire or gas monitoring system, or a security or a HVAC-type system all without limitation. Fall indicating communications received by system 20 can be presented on an operators control station 22 with a visual display 22a and a manually operable input, such as a keyboard 22b. An audio/visual fall indicating alarm unit 24 can also be provided, coupled to system 20.

Figure 2:
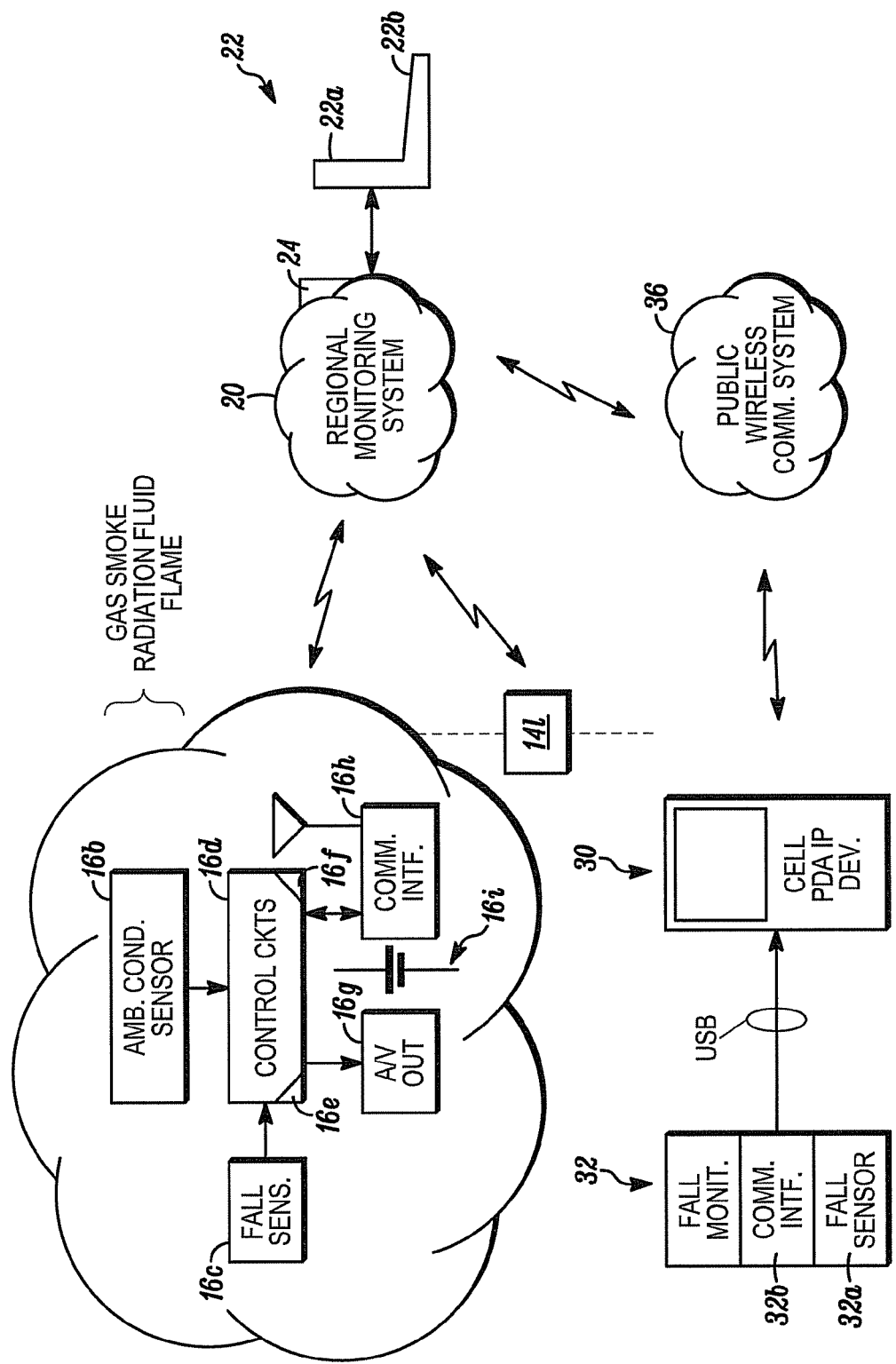
FIG. 2 is a block diagram of an alternate embodiment with added details.

FIG. 2 illustrates an alternate system 10-1. Elements of FIG. 2 which were discussed above have been assigned the same identification numerals and need not be discussed further.

Exemplary details of a detector 14a, comparable to other members of the plurality 14 include a housing 16a. Housing 16a carries at least one ambient condition sensor 16b, such as a gas sensor, a radiation sensor, a flame sensor, or a fluid sensor, all without limitation. Housing 16a also carries a fall sensor 16c. Outputs from sensors 16b, 16c are coupled to control circuits 16d which could be implemented in part by a programmable processor 16e and storage circuitry 16f for one or more executable control, alarm output or communications programs, or modules.

The housing 16a can also carry an audio/visual alarm indicator, for example a fall indicating or an ambient condition indicating, output device 16g. A wireless communications interface, and antenna, 16h is coupled to the control circuits 16d and can transmit both fall indicators, or other ambient condition indicators directly or indirectly to monitoring system 20.

System 10-1 can also include one or more commercially available wireless, for example cellular-type, or internet protocol-type products, such as cell phones, PDAs, or the like 30 to which can be coupled a fall detecting module 32, for example via a USB-type port. The module 32 can include a fall sensor 32a and communications interface 32b to provide fall indicating signals to the communications device 30.

Device 30 can in turn communicate via a publicly available wireless network 36 with the monitoring system 20. Fall indicating alarms can be provided locally via output device 30a on the communications device 30 or via the alarm indicating device 24 of the monitoring system 20.

Figure 3:
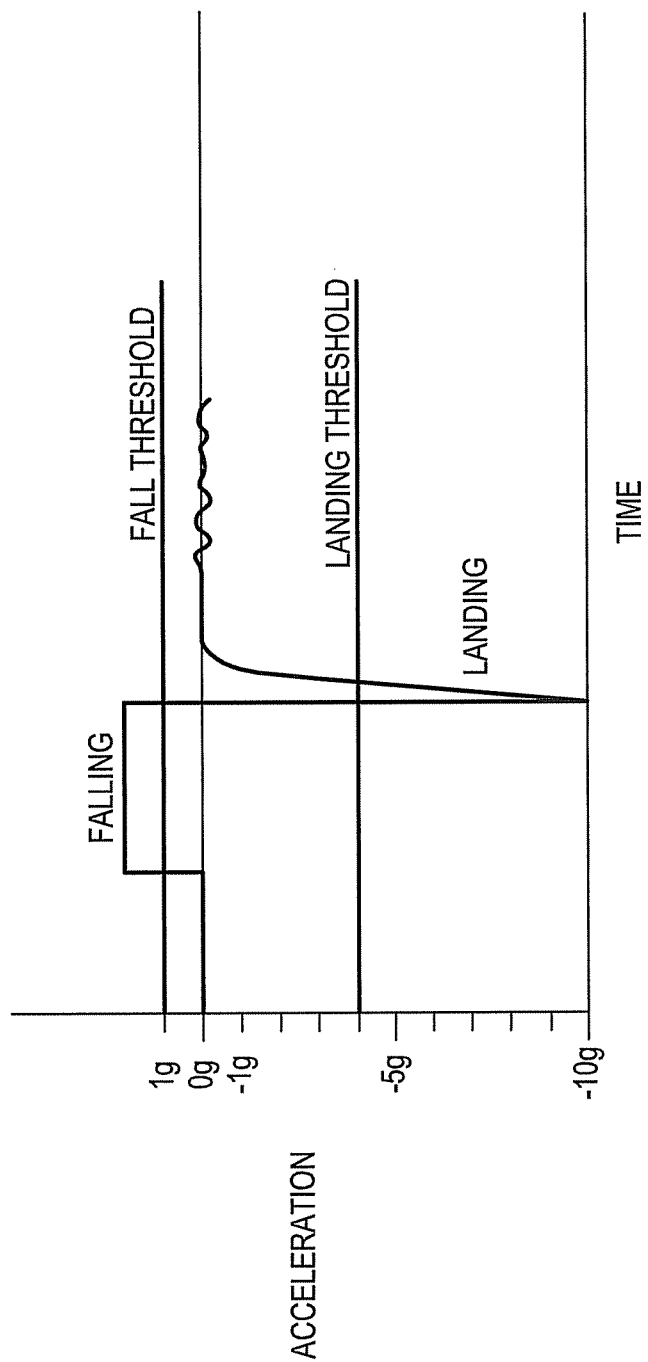
FIG. 3 is a graph illustrating exemplary outputs from an accelerometer usable in the system of FIG. 1.

FIG. 3 is a graph of an output signal from a fall sensors 16c, implemented as an accelerometer. Fall and landing thresholds can be established and used by control circuits 16d, or the displaced monitoring system 20 to determine that a fall has, or is occurring. Such thresholds can be altered locally by control circuits 16d or at the monitoring system 20 over time thereby providing improved, or enhanced sensitivity to fall events.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A system comprising:
    a fall sensing device;
    an apparatus responsive to an ambient or environmental condition and to an output from the device to produce an indicator of either the ambient or environmental condition, or a fall; and
    an alarm generating unit, responsive to the apparatus, to generate at least a fall indicating indicium,
    where the fall sensing device includes at least one of an acceleration sensor, or a position sensor, and
    where the fall sensing device or the apparatus increases detection of a serious fall event by temporarily changing selected motion detection parameters after the fall sensing device or the apparatus detect an acceleration beyond a certain threshold, and
    where, during a period of altered motion parameters after a possible fall, the apparatus generates an alarm signal in the absence of the fall sensing device or the apparatus detecting motion for a predetermined period of time.

2. A system as in claim 1 where the indicium is selected from a class which includes an audible alarm, a visual alarm, or an audible alarm and a visual alarm.

3. A system as in claim 2 where the unit is located local to the apparatus.

4. A system as in claim 3 where a different alarm unit is displaced from the apparatus and is in-part in wireless communication therewith.

5. A system as in claim 1 which includes a housing which carries the device, the apparatus and the unit and where the apparatus includes control circuits coupled to the device and the unit.

6. A system as in claim 5 which includes a bi-directional communication link enabling a remote monitoring system to send a message to the apparatus.

7. A system as in claim 6 where the control circuits include a programmable processor and readable storage wherein a control program is stored and executable by a microprocessor to determine when the fall has occurred and which activates the alarm generating unit.

8. A system as in claim 7 which includes executable instructions, responsive to the determination that a fall has occurred, to communicate that the fall has occurred to a displaced monitoring system.

9. A system as in claim 1 where selectivity to fall events is adjusted over time by altering selected fall and landing thresholds and processing.

10. A system as in claim 1 where the apparatus comprises a gas detector and where the gas detector is portable, and wearable by a user and which includes a housing which carries the device, the apparatus and the unit.

11. A system as in claim 10 where the apparatus includes control circuits coupled to the device and the unit.

12. A system as in claim 11 where the control circuits include a programmable processor and readable storage wherein a control program is stored and executable by a microprocessor to determine when the fall has occurred and which activates the alarm generating unit.

13. A system as in claim 12 which includes executable instructions, responsive to the determination that a fall has occurred, to communicate that the fall has occurred to a displaced monitoring system.

14. An apparatus comprising:
a fall sensor;
a gas sensor; and
control circuits, responsive to outputs from at least the fall sensor to detect the presence of a fall, and generate a fall related indicium,
where the fall sensor or the control circuits increase detection of a serious fall event by temporarily changing selected motion detection parameters after the fall sensor or the control circuits detect a possible fall event, and
where, during a period of altered motion parameters after the possible fall event, the control circuits generate the fall related indicium in the absence of the fall sensor or the control circuits detecting motion for a predetermined period of time.

15. An apparatus as in claim 14 where the control circuits respond to outputs from the gas sensor to detect the presence of a predetermined gas condition, and, to generate a gas concentration related indicium.

16. An apparatus as in claim 15 where the sensors are carried in a common, portable, housing.

17. An apparatus as in claim 16 where the indicia are coupled to an alarm indicating output device.

18. An apparatus as in claim 17 where the output device is displaced from the housing.

* * * * *